(12) United States Patent
Lifshitz et al.

(10) Patent No.: US 12,218,806 B2
(45) Date of Patent: Feb. 4, 2025

(54) OBJECT STORAGE GATEWAY FOR IoT DEVICES WITH INTERMITTENT NETWORK CONNECTIVITY

(71) Applicant: Red Hat, Inc., Raleigh, NC (US)

(72) Inventors: Yuval Lifshitz, Kfar HaOranim (IL); Yehoshua Salomon, Kfar Saba (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/975,398

(22) Filed: Oct. 27, 2022

(65) Prior Publication Data

US 2024/0146618 A1    May 2, 2024

(51) Int. Cl.
*H04L 41/16* (2022.01)
*H04L 12/66* (2006.01)
*H04L 41/0896* (2022.01)
*H04L 43/028* (2022.01)

(52) U.S. Cl.
CPC ............ *H04L 41/16* (2013.01); *H04L 12/66* (2013.01); *H04L 41/0896* (2013.01); *H04L 43/028* (2013.01)

(58) Field of Classification Search
None
See application file for complete search history.

(56) References Cited

U.S. PATENT DOCUMENTS

| 7,899,917 B2* | 3/2011 | Chitre ............... H04L 67/1095 707/610 |
| 9,330,106 B2 | 5/2016 | Piasecki et al. |
| 2006/0077949 A1* | 4/2006 | Allen ............... H04L 67/1095 370/503 |
| 2019/0132389 A1* | 5/2019 | Lillie ............... H04L 67/1095 |
| 2020/0344297 A1 | 10/2020 | Agarwal et al. |
| 2022/0053045 A1 | 2/2022 | Wilczynski et al. |

OTHER PUBLICATIONS

Microsoft, "Store Data at the Edge with Azure Blob Storage on IoT Edge," https://docs.microsoft.com/en-us/azure/iot-edge/how-to-store-data-blob?view=iotedge-2020-11, 2022, 14 pages.

Tian Wang et al., "Fog-Based Computing and Storage Offloading for Data Synchronization in IoT," IEEE Internet of Things Journal, vol. 6, No. 3, Jun. 2019, https://www.researchgate.net/publication/328309150_Fog-Based_Computing_and_Storage_Offloading_for_Data_Synchronization_in_IoT/, IEEE, 11 pages.

(Continued)

*Primary Examiner* — Angela Nguyen
(74) *Attorney, Agent, or Firm* — Womble Bond Dickinson (US) LLP

(57) ABSTRACT

Systems and methods providing object storage gateway for a client device with intermittent connectivity. In one implementation, data objects stored locally on the client device are identified. The data objects are associated with an application running on the client device. Filtered data are produced by filtering the data objects in view of a set of rules. Responsive to determining that a connection between the client device and the server device satisfies a quality condition, the filtered data are synchronized with the server device.

20 Claims, 5 Drawing Sheets

(56) References Cited

OTHER PUBLICATIONS

Wai Gen Yee et al., "Scalable Synchronization of Intermittently Connected Database Clients," Database and Information Retrieval Laboratory Department of Computer Science Illinois Institute of Technology Chicago, https://citeseerx.ist.psu.edu/viewdoc/download?doi=10.1.1.83.6719&rep=rep1&type=pdf , 2005, 5 pages.
Amazon Web Services, Inc., "Securing Internet of Things (IOT) with AWS," https://d1.awsstatic.com/whitepapers/Security/Securing_IoT_with_AWS.pdf, Dec. 20, 2021, 40 pages.

* cited by examiner

US 12,218,806 B2

OBJECT STORAGE GATEWAY FOR IoT DEVICES WITH INTERMITTENT NETWORK CONNECTIVITY

TECHNICAL FIELD

The present disclosure is generally related to operating systems, and more particularly, to implementing an object storage gateway for Internet of Things (IoT) devices with intermittent network connectivity.

BACKGROUND

The Internet of Things (IoT) includes multiple computing devices connected to one or more interconnected networks. IoT devices can send and receive large amounts of data to and from other nodes in the cloud. Some IoT devices run applications that process and analyze the data collected by the device, a strategy known as edge computing.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
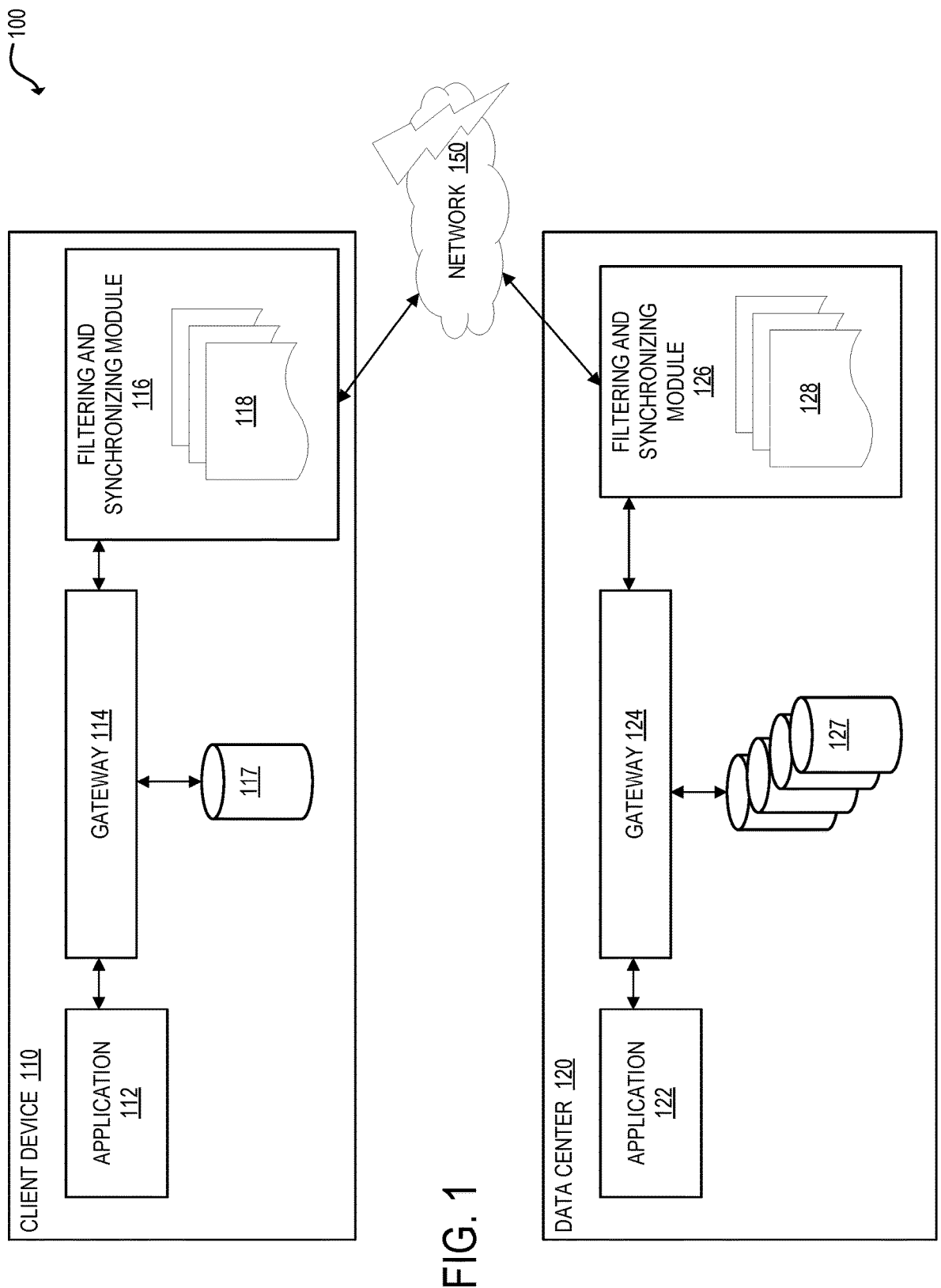
FIG. 1 depicts a block diagram of an example distributed networking system operating in accordance with one or more aspects of the present disclosure.

Implementations of the disclosure are directed to providing an object storage gateway for IoT devices with intermittent network connectivity. An IoT device is a physical computing device that can generate data, receive data from other IoT devices, and/or process the data. The IoT device can be connected to other IoT device and/or to an edge device through a network. The edge device can collect and process data from multiple IoT devices and/or from other edge devices. Embodiments of the present disclosure can be implemented on IoT devices, as well as on edge devices in an IoT deployment. IoT devices and edge devices can send data to, and receive data from, a data center through a network (e.g., through the Internet). Edge computing requires network connectivity to central locations for different purposes, such as to allow remote management, to receive automation instructions, to forward network telemetry traffic needed for analytics, and to send data information which will be lately stored in databases and analyzed to accomplish business objectives.

As mentioned above, an IoT computing device can generate data, receive data from multiple devices, process the data, and/or execute upon it in almost real-time. An IoT computing device can report data to other IoT devices. As an example, an IoT device can be a sensor in a forest that analyzes data about the environment in which the IoT device is located. The IoT device can generate data (e.g., temperature readings, humidity levels, etc.), can exchange the generated data with other sensors in the same forest, and/or can receive data from other sensors in the same forest. The IoT device can then analyze the generated and/or received data to make certain determinations (e.g., to determine the fire danger level for the forest in which the device is located). In order to collect, process, and execute upon data, the IoT device needs to have reliable storage that includes techniques to protect from disc failures. Cloud-based object storage can be a reliable storage system for devices that have reliable network connectivity. However, since object storage requires a network based programming interface (API), conventional object storage systems are not reliable without a reliable network connection.

Some IoT deployments, however, operate in network-challenged environment. A network-challenged environment can include any environment in which the network connection is unreliable and/or unstable, including intermittent connectivity and/or slow connections. Some connectivity problems can be related to cost (e.g., it may be too expensive to be constantly connected via satellite), to power usage (e.g., a connection that relies on solar power may be unable to connect on cloudy days), or a lack of cellular coverage (e.g., a car driving through an unpopulated area may not have a reliable connection), for example. Implementing a conventional cloud-based object storage solution on IoT devices in a network challenged environment can result in multiple error messages (e.g., failed write requests), and thus is not a practical reliable storage solution. Furthermore, cloud-based object storage solutions require specific credentials and/or security keys in order to authenticate access requests. Distributing the required credentials and keys can be difficult in a network-challenged environment, and storing the credentials and/or security keys in IoT devices can pose a security risk. Many IoT devices are small and located in remote areas, making them easy targets. Due to their small size and remote locations, some IoT devices are susceptible to being stolen and/or tampered with, increasing the security risks associated with storing access credentials and/or security keys on the device.

Aspects of the present disclosure address the above-noted and other deficiencies by providing cloud-based object storage to applications running on a client device (such as an IoT device) in network-challenged environments. The client device can have an intermittent, unstable, and/or unreliable connection to a data center. To provide a reliable object storage system, the client device can implement a client-side filtering and synchronizing module to send and receive data to/from the data center, and the data center can implement a server-side filtering and synchronizing module to send and receive data to/from the edge device.

The object storage solution is implemented on the client device via an object storage gateway, which stores data objects locally on the client device. A client application running on the client device generates object data, and transmits the object data to an object storage gateway. The object storage gateway can employ an API to connect the client application to the local storage on the client device. In some embodiments, the object storage gateway can provide a representational state transfer (REST) interface, enabling the application to employ an object storage solution. A REST interface can be an API that conforms to the REST architecture style. A RESTful API can transfer a representation of the state of the resource to the requestor or endpoint, via HTTP, for example. Thus, the object storage gateway can map object data from the client application to local storage on the client device. The object storage gateway can store the data in local storage on the client device. The object storage gateway can be connected to the client-side filtering and synchronizing module, giving the client-side filtering and synchronization module access to the local storage on the client device.

The client-side filtering and synchronizing module reads the data from local storage via the object storage gateway and filters the data objects according to a set of rules. The set of rules can specify which data objects are to be transmitted to the data center server device. For example, the set of rules can specify a data type and/or a timeframe, and the client-side filtering and synchronizing module can filter the data to include data of the specified data type and/or data that was generated within the timeframe. As another example, the set of rules can, additionally or alternatively, identify a score to the data, e.g., indicating an importance level of the data, and the client-side filtering and synchronizing module can filter the data to include data that has a corresponding important level score above a certain thresholds. Thus, the client-side filtering and synchronizing module generates filtered data using the set of rules. The client-side filtering and synchronizing module synchronizes the filtered data with a data center upon detecting that a connection with the data center server meets a quality criterion. The quality criterion can be utilized to ensure that the network connection is reliable and/or stable enough to support the synchronization process. For example, the quality criterion can specify the minimum bandwidth metric, a minimum data speed metric, a jitter metric of the connection, and/or other quality metrics associated with the network connection.

The data center receives the filtered data, and processes the filtered data into object storage proxy object-containers based on the metadata associated with the filtered data. An object-container, also referred to as a bucket, stores a collection of objects. The filtered data metadata can specify, for instance, an object ID, an object-container ID, a creation date, a modification date, a size, and/or privacy/security settings, etc. Using the metadata, the data center can identify the object storage proxy object-container and/or the object ID, and can write the filtered data as data objects to the identified object-container. The server-side filtering and synchronizing module transmits the object storage proxy object-containers to an object storage gateway that stores the object storage proxy object-containers in a storage cluster.

In some embodiments, an application running on the data center can use the filtered data to train (or retrain) a machine learning (ML) model executed by the application running on the client device. The application running on the client device can provide, as input to the trained ML model, data generated and/or received by the client device, and can receive, as output from the trained ML model, a prediction. As an example, the client device can be a sensor in a forest that generates and/or receives environmental data (e.g., temperature, humidity level, etc.). The application running on the client device can provide the environmental data to the trained ML model, and can received as output a predicted fire danger level. The data center application can then transmit the trained ML model, via the object storage gateway, to the server-side filtering and synchronizing module. The server-side filtering and synchronizing module can transmit the received trained ML model to the client device, upon determining that the connection with the client device meets a quality criterion. In some embodiments, the server-side filtering and synchronizing module can first filter the data received from the data center application before synchronizing it with a client device. The client-side filtering and synchronizing module can receive data (e.g., the trained ML model) from the server-side filtering and synchronizing module, and can transmit the received data to the client application via the object storage gateway.

In some embodiments, the object storage gateway running on the client device can read the data objects stored in the local storage, and synchronize them with a storage on the server device. A server-side filtering and synchronizing module can then filter the data synchronized with the storage on the server device, and transmit the filtered data to a storage cluster via an object storage gateway.

Aspects of the present disclosure present advantages, including but not limited to, enabling applications to implement object storage solutions on both the client device and the data center server device. That is, an application that uses an object storage solution can run on an IoT device, an edge device, a server device, and/or any other computing device with minimal modifications. The application can use a cloud-based object storage API on any of these devices, even if the network connection between the device and the cloud is unreliable, unstable, slow, and/or intermittent. Aspects of the present disclosure also eliminate the need to distribute, and for the client device to store, the credentials and/or security keys required to access the cloud-based object storage solution. Rather, the client device stores credentials and/or security keys to access the local storage on the client device, and the server-side filtering and synchronizing module can review the received data to determine whether the client device has been tampered with. In some embodiments, the server-side filtering and synchronizing module can sandbox the data received from multiple client devices, in order to review the data prior to writing the data to storage clusters on the server device. As such, aspects of the present disclosure eliminate the need to distribute and manage, to multiple client devices, the credentials and/or security keys needed to access cloud-based object storage solutions, thus increasing overall security of the storage solution. Furthermore, aspects of the present disclosure support bidirectional and partial synchronization between a client device and the data center server device, thus improving the overall storage solutions on both the client device and the data center server device.

FIG. 1 is a block diagram of an example distributed networking system 100, in which embodiments of the present disclosure may operate. One skilled in the art will appreciate that other architectures are possible, and that the implementation of a computer system utilizing examples of the invention are not necessarily limited to the specific architecture depicted by FIG. 1.

The distributed networking system 100 includes one or more client devices 110 connected, via a network 150, to a data center 120. Client device 110 can be a computing device that generates data, and/or a computing device that collects data from other edge or IoT devices. Examples of client device 110 include a sensor installed in a remote location (e.g., a device installed outside of a certain radius from a city center, or located at least a certain distance from any business, residence, and/or hospital), a smart device installed in a home, a smart mobile device, and/or any IoT device. A smart device is a context-aware electronic device that can perform autonomous computing and that is able to connect to, and interact with, another device (e.g., another smart device and/or an edge device). Examples of smart devices include, but are not limited to, smartwatches, smart glasses, smart television sets, smart appliances (e.g., refrigerators, ovens, dishwashers, thermostats, alarms, air conditioners, radios, receivers, amplifiers, etc.), and/or other personal electronics. A smart mobile device can be a smart device that is portable, such as a smart phone or a smart tablet. In some embodiments, client device 110 can be installed in a motor vehicle, such as an autonomous car. In some embodiments, client device 110 can be installed in an unmanned aerial vehicle, such as a drone.

Client device 110 can process data that it generates and/or collects, and can transmit the processed data to data center 120 via network 150. In embodiments, client device 110 can include one or more processing devices communicatively coupled to memory devices and input/output devices. Each computing device (e.g., client device 110 and/or data center 120) can include additional resources not pictured in FIG. 1, such as one or more central processing units (CPU), main memory, which may include volatile memory devices (e.g., random access memory (RAM)), non-volatile memory devices (e.g., flash memory) and/or other types of memory devices, a storage device (e.g., one or more magnetic hard disk drives, a Peripheral Component Interconnect (PCI) solid state drive, a Redundant Array of Independent Disks (RAID) system, a network attached storage (NAS) array, etc.), and one or more devices (e.g., a Peripheral Component Interconnect (PCI) device, network interface controller (NIC), a video card, an input/output device, etc.). In certain implementations, the main memory may be non-uniform access (NUMA), such that memory access time depends on the memory location relative to CPU.

The network 150 can be a private network (e.g., a local area network (LAN), a wide area network (WAN), intranet, etc.) or a public network (e.g., the Internet). In one example, the network 150 can include a wired or a wireless infrastructure, which can be provided by one or more wireless communications systems, such as a wireless fidelity (WiFi) hotspot connected with the network and/or a wireless carrier system that can be implemented using various data processing equipment, communication towers (e.g., cellular towers), satellites, etc. The client device 110 and data center 120 can send and receive data via network 150 using an application programming interface (API), for example. The network 150 can provide intermittent connectivity between client device 110 and data center 120. For example, the connection provided by network 150 can unreliable or unstable, such as being prone to connection failures or to a slow connection.

Client device 110 can run one or more applications 112 and a filtering and synchronizing module 116. Application 112 running on client device 110 can collect data, and using gateway 114, can store the data using an object storage format in local storage 117. Gateway 114 can be an object storage gateway, and can implement an API that is capable of receiving data objects and their associated metadata from application 112, and writing the data and their associated metadata to local storage 117. Local storage 117 can be local file storage, a database, or any other kind of storage solution. In some embodiments, the gateway 114 can provide a REST interface. Gateway 114 can implement a RESTful web service by using HTTP and the principals of REST. Filtering and synchronizing module 116 can read data from local storage 117, via gateway 114.

Filtering and synchronizing module 116 can read data stored in local storage 117, and can produce filtered data 118. In some embodiments, filtered data 118 can indicate which of the data of local storage 117 to synchronize with data center 120. Application 112 and/or application 122 can provide the set of rules used by the filtering and synchronizing module 116. The set of rules can include a simple rule, such as identifying a specific object-container to monitor for changes. The set of rules can be complex, such as a module that implements a filtering mechanism for the data stored in local storage 117. In some implementations, the set of rules can specify a data type and/or a time period for filtering the data stored in local storage 117. The set of rules can reflect the business logic of the application 122 and/or application 112. In some implementations, the set of rules can, additionally or alternatively, assign an importance score to each data item, reflecting an importance level of the data, and the set of rules can include a threshold importance score for filtering the data. In some implementations, the importance score can be assigned using a machine learning model. For example, filtering and synchronization module 116 can process images from a surveillance camera and can assign an image a high importance score upon determining that the image contains an interesting feature.

Filtering and synchronizing module 116 can use a set of rules to filter the data stored in local storage 117. The set of rules can specify which data to transmit to data center 120. For example, filtering and synchronizing module 116 can filter, using the set of rules, the data objects stored in local storage 117 based on the metadata describing the data objects. For example, filtering and synchronizing module 116 can check for modifications made to specified object-containers in local storage 117, and can include the modified data in the specified object-containers in filtered data 118. The object-containers can be specified in the set of filtering rules. The metadata can specify a variety of details for the data objects, including, for example, age, privacy/security settings, access contingencies, etc. Filtering and synchronizing module 116 can further update the metadata associated with the filtered data objects 118, e.g., to provide the data center 120 with additional instructions on how to use the filtered data objects. In some embodiments, filtering and synchronizing module 116 can fetch filtered data items from local storage 117 into files via object storage gateway 114.

Filtering and synchronizing module 116 can monitor the connection of network 150 to determine a connection quality metric. The quality metric can include an available bandwidth, a measured network speed, a network jitter metric, a latency metric, and/or any other connectivity quality metrics. In some implementations, the quality metric can be a binary single-bit flag that indicates whether the connection is operational or not (e.g., a value of zero indicates that the connection is operational, and a value of one indicates that the connection is not operational). In some implementations, the filtering and synchronizing module 116 can use ping results to calculate the connection quality metric(s). The filtering and synchronizing module 116 can determine whether the quality criterion metric satisfies a quality criterion. In some implementations, the quality criterion can be satisfies if the quality metric is above a minimum threshold. In some implementations, the quality criterion can be associated with a number of connection quality levels. For example, if the quality metric is above a first threshold, the filtering and synchronizing module 116 can determine that the connection quality is "good;" if the quality metric is between the first threshold and a second threshold, the filtering and synchronizing module 116 can determine that the connection is "reasonable;" if the quality metric is between the second threshold and a third threshold, the filtering and synchronizing module 116 can determine that the connection is "slow;" and if the quality metric is below the third threshold, the filtering and synchronizing module 116 can determine that the connection is "down." Note that there can be more or fewer than four "levels," or more or fewer than three thresholds.

In some embodiments, the set of rules can associate each predefined connection quality level with a synchronization policy. For example, all the data can be synchronized if the quality metric is above the first threshold (e.g., the connection quality is "good"); 50% of the data can be synchronized if the quality metric is between the first and second thresholds (e.g., the connection quality is "reasonable"); 20% of the data can be synchronized if the quality metric is between the second and third thresholds (e.g., the connection quality is "slow"); and none of the data can be synchronized if the quality metric is below the third threshold. Note that these are merely examples of synchronization policies. In some embodiments, the synchronization policies can be defined by, or modified by, a user of client device 110 and/or of data center 120.

In some embodiments, to determine the data to synchronize (when synchronizing less than 100% of the data), the filtering and synchronizing module 116 can identify a score indicating an importance level of corresponding data objects (e.g., the score can be included in the metadata associated with the data object). In embodiments, the filtering and synchronizing module 116 can process the data and assign the score based on, for example, the set of rules. As an example, the filtering and synchronizing module 116 can process images from a surveillance camera, and the set of rules can define the scores based on whether an image contains an feature of interest. As another example, the filtering and synchronizing module 116 can include a trained machine learning model that is trained to assign a score to each data object. The synchronization policies can then associate a score range for each quality level. For example, the filtering and synchronizing module 116 can rank the data in order of their corresponding scores, and the filtering and synchronizing module 116 can synchronize the data according to their corresponding scores. For example, if the connection quality is considered "reasonable," 50% of the most important data is synchronized, while if the connection quality is considered "slow," 20% of the most important data is synchronized.

Upon determining that the quality metric satisfies a quality criterion (e.g., is above a minimum threshold, or is within one of the predefined levels), filtering and synchronizing module 116 can synchronize the filtered data 118 to data center 120. For example, filtering and synchronizing module 116 can synchronize filtered data 118 based on the signatures (e.g., hash values) of the filtered data 118. That is, filtering and synchronizing module 116 can compare the hash values of the filtered data 118 to the data stored at the data center 120. As another example, filtering and synchronizing module 116 can transfer and synchronize filtered data 118 between data center 120 and client device 110 by comparing modification times and sizes of files. That is, filtering and synchronizing module 116 can synchronize filtered data 118 with data stored on the data center 120 by identifying files with the same name in each filtered data 118 and in data stored on the data center 120, and if the size of the files with the same name is different, filtering and synchronizing module 116 can identify the file with most recent modification time. Filtering and synchronizing module 116 can then overwrite the file with the less recent modification time with the file with the most recent modification time. This is an example for synchronizing data, and any other synchronization method can be used by filtering and synchronization module 116.

Data center 120 can include one or more applications 122, and a filtering and synchronizing module 126. Filtering and synchronizing module 126 of data center 120 can receive the filtered data 118. Filtering and synchronizing module 126 can read the received filtered data 118, including the associated metadata, and can process the filtered data 118. In some embodiments, the associated metadata can be a set of key-value pairs that uniquely identify the objects in an object-container. In some embodiments, filtering and synchronizing module 126 can convert, based on the metadata, the filtered data 118 into object storage proxy object-containers. That is, the filtering and synchronization module 126 can use the key-value pair to place the object into the identified object-container. The filtering and synchronizing module 126 can write, via gateway 124, the object storage proxy object-containers to storage cluster 127. The application 122 running on data center 120 can then access the filtered data objects in storage cluster 127.

In some embodiments, application 122 can use the received filtered data objects to train (or retrain) an ML model associated with application 112 running on client device 110. The application 122 can store the trained ML model in storage cluster 127, via gateway 124. Filtering and synchronizing modules 116 and 126 enable applications 112 and 122 to use object storage solutions even when the connection via network 150 is unreliable, unstable, and/or intermittent.

Filtering and synchronizing module 126 of data center 120 can implement a similar synchronization and filtering mechanism as filtering and synchronizing module 116 to filter and transmit data 128 to client device 110. That is, application 122 can generate data to send to client device 110 (e.g., a set of changes associated with application 112, such as update information (e.g., a software update), or updated traffic and road condition information for a traffic application running on an autonomous vehicle device). Application 122 can store the data in storage cluster 127. Filtering and synchronizing module 126 can filter the data in storage cluster 127, e.g., based on a set of filtering rules. The set of filtering rules can be specified by the application 122, and/or can be associated with client device 110 (e.g., the set of rules can vary based on the client device receiving the data). The filtering rules can specify which data objects in storage cluster 127 to transmit to client device 110 based on the data objects metadata, for example. Filtering and synchronizing module 126 can generate filtered data 128, and can transmit the filtered data 128 to client device 110 upon determining that the connection with network 150 satisfies the quality criterion. That is, filtering and synchronizing module 126 can implement a set of rules associated with client device 110 to filter data stored in storage cluster 127, producing filtered data 128. The set of rules can be received from application 122 and/or application 112, and can specify the business logic for the application 122, 112. For example, the set of rules can be a simple rule, such as identifying a specific trained ML model to transfer to client device 110. The set of rules can be more complex, and can include a module that implements a filtering mechanism for the data stored in storage cluster 127. The filtering and synchronizing module 116 of client device 110 can read the filtered data 128, and can transmit the received filtered data 128 to application 112 via gateway 114.

As an illustrative example, client device 110 can be an IoT device that receives readings from sensors placed throughout a forest. The sensors can generate environmental data, such as temperature and humidity level, and can transmit the environmental data to client device 110. Client device 110 can be located in the same forest as the sensors, and can itself include a sensor that also collects environmental data. In some implementations, client device 110 is located outside of the forest. Application 112 can receive the environmental data, and in some implementations can analyze the environmental data (e.g., using a trained ML model) to predict the likelihood of a forest fire. The application 112 running on the client device 110 transmits the object environmental data using a RESTful API. The object storage gateway stores the data from application 112 in local storage 117. The data can include, for example, the environmental data received from the sensors, a subset of the environmental data received from the sensors, and/or a prediction of a likelihood of a forest fire starting in the area in which the sensors connected to client device 110 are located. Filtering and synchronizing module 116 can then read the data stored in local storage 117, and filter the data based on the metadata of the data. In filtering the data, filtering and synchronizing module 116 can update the metadata. Filtering and synchronizing module 116 can determine when the connection with network 150 satisfies the quality criterion, and when it does, filtering and synchronizing module 116 synchronizes the filtered data with data center 120. Filtering and synchronizing module 126 of data center 120 receives the filtered data, processes the data, and stores it in storage cluster 127. Application 122 can then use the data in storage cluster 127. In this illustrative example, application 122 can use the data to retrain the ML model used to predict the likelihood of a forest fire, associated with application 112. For example, the data in storage cluster 127 can include at least the subset of environmental data received from the sensors within a time period, the prediction of the likelihood of a forest fire starting in the area during the time period, and an indication of whether a forest fire has started during the time period. The application 122 can use this data to retrain the ML model. Application 122 can then transmit the retrained ML model to client device 110, via filtering and synchronizing module 126. Filtering and synchronizing module 126 can filter the data (e.g., the retrained ML model) received from application 122. Filtering the data can include updating the metadata associated with the data, e.g., to instruct application 112 on how to use the data. When filtering and synchronizing module 116 receives data from data center 120, it transmits it to application 112 via gateway 114.

Figure 2:
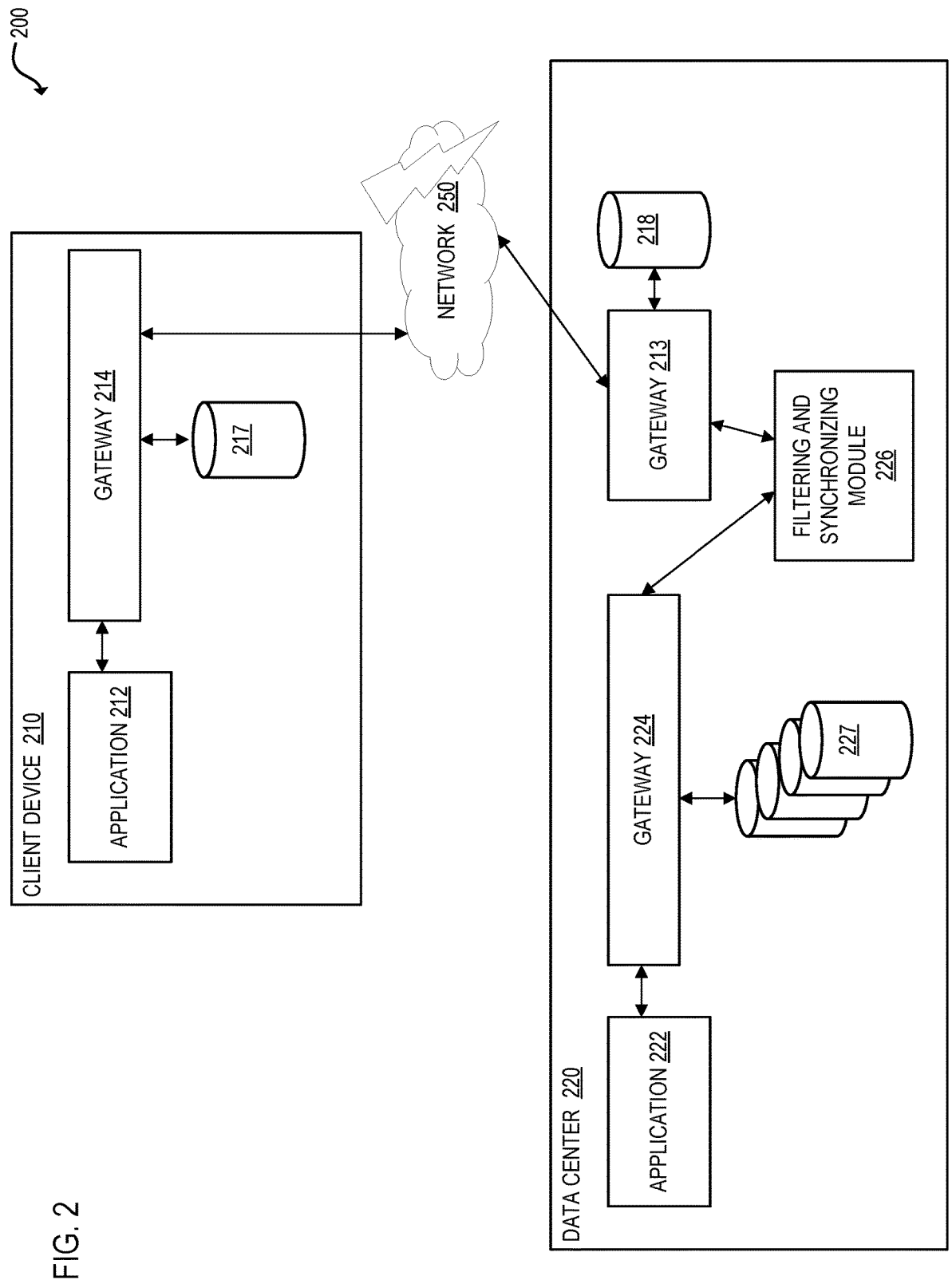
FIG. 2 depicts of a block diagram of another example distributed networking system operating in accordance with one or more aspects of the present disclosure.

FIG. 2 is a block diagram of another example of distributed networking system 200, in which embodiments of the present disclosure may operate. One skilled in the art will appreciate that other architectures are possible, and that the implementation of a computer system utilizing examples of the invention are not necessarily limited to the specific architecture depicted by FIG. 2.

The distributed networking system 200 can be implemented in an environment in which the connection quality via network 250 is reliable most of the time (e.g., the connection satisfies the reliability criterion 90% of the time of more), but occasionally the connection is lost or falls below the quality criterion. As an illustrative example, client device 210 may be a motor vehicle that collects and transmits data to a data center 220 via a cellular connection. Most of the time the motor vehicle client device 210 has a reliable connection to the data center 220, however occasionally the motor vehicle client device 210 may drive to a location with unreliable and/or inconsistent cellular coverage. As another illustrative example, client device 210 may be an IoT device that generates relatively small amounts of data. For example, client device 210 may be an IoT device that generates an amount of data per time period that is less than a certain threshold amount. Network 250 may be unreliable, unstable, slow, and/or intermittent, however since client device 210 generates a relatively small amount of data, the generated data can be stored locally on local storage 217 until the connection over network 250 satisfies the quality criterion. Distributed networking system 200 is designed to operate in such environments.

Similar to application 112 of FIG. 1, application 212 can generate data objects and write them to object storage gateway 214. Object storage gateway 214 can write the data objects to local storage 217. Local storage 217 can be a file system or a database, for example. Gateway 214 can function the same as, or similar to gateway 114 of FIG. 1. Local storage 217 can synchronize with data center 120, responsive to a triggering event and/or upon a predetermined schedule. For example, local storage 217 can synchronize with data center once a day, once a week, or once a month. In some embodiments, the schedule can be determined by application 212, and/or application 222. In some embodiments, the local storage 217 can synchronize with data center 120 upon determining that the connection via network 250 satisfies the quality criterion. In some embodiments, the local storage 217 can synchronize with data center 120 once local storage 217 reaches a predetermined capacity (e.g., either a percentage of the maximum storage capacity, or a specified storage size).

Gateway 213 of data center 220 can synchronize storage 217 with storage 218. In some embodiments, gateway 213 can function the same as or similar to gateway 214. That is, gateway 213 can be used for synchronizing storage 217 with storage 218 by enabling filtering and synchronization module 226 to fetch data from storage 217 when possible (e.g., when the connection via network 250 satisfies a quality criterion). In some embodiments, gateway 213 is not required, and storage 217 is synchronized with storage 218 using an alternative connection, such as a private peer-to-peer connection. Filtering and synchronizing module 226 can filter the synchronized storage 218, according to a predetermined set of filtering rules (e.g., as determined by application 222 and/or application 212). Filtering and synchronizing module 226 can write the filtered data to gateway 224, which can convert (e.g., based on the metadata) the filtered data into object storage proxy object-containers, and store the object storage proxy object-containers in storage cluster 227. In some embodiments, gateway 224 can function the same as, or similar to gateway 124 of FIG. 1. Application 222 can then access storage cluster 227, and read the synchronized data generated by application 212.

Filtering and synchronizing module 226 of data center 220 can implement a similar synchronization and filtering mechanism as filtering and synchronizing module 126 of FIG. 1 to filter and transmit data from storage cluster 227 to client device 210. Filtering and synchronizing module 226 can read data stored in storage cluster 227, and can filter the data according to set of filtering rules (e.g., specified by application 222 or 212, and/or based on client device 210). Filtering and synchronizing module 226 can store the filtered data in storage 218, e.g., via gateway 213. Storage 218 can then be synchronized with local storage 217, on a predetermined schedule and/or responsive to a triggering event (e.g., the storage 218 reaches a certain capacity, and/or the connection for network 250 satisfies the quality criterion).

Aspects of the present disclosure enable a distributed networking system to alternate between the distributed networking system 100 of FIG. 1 and the distributed networking system 200 of FIG. 2. That is, aspects of the present disclosure can enable a distributed networking system to alternate between implementing a filtering and synchronizing module 116 on client device 110 (as illustrated in FIG. 1) and transmitting data directly from gateway 214 to data center 220 (as illustrated in FIG. 2). In such embodiments, the network connection can be consistently strong. For instance, the network connection can be above a high quality metric for a high percentage of the time (e.g., the network connection is above a first, higher quality criterion for 90% of the time). When that is the case, the client device can operate as described in accordance with FIG. 2, and synchronize the data generated by the application running on the device nearly continuously. Then, when the network connection falls below the high quality metric for a specified amount of time, the client device can switch to operating as described in accordance with FIG. 1, by implementing a filtering and synchronization module on the client device (i.e., filtering and synchronizing module 116). When the network connection returns to satisfying the high quality metric for the high percentage of time, the client device can operate as described in accordance with FIG. 2. In embodiments, the filtering and synchronizing module 116 of FIG. 1 can determine when to alternate between filtering the data on client device 110, 210, and when to simply synchronize the data to data center 220.

Figure 3:
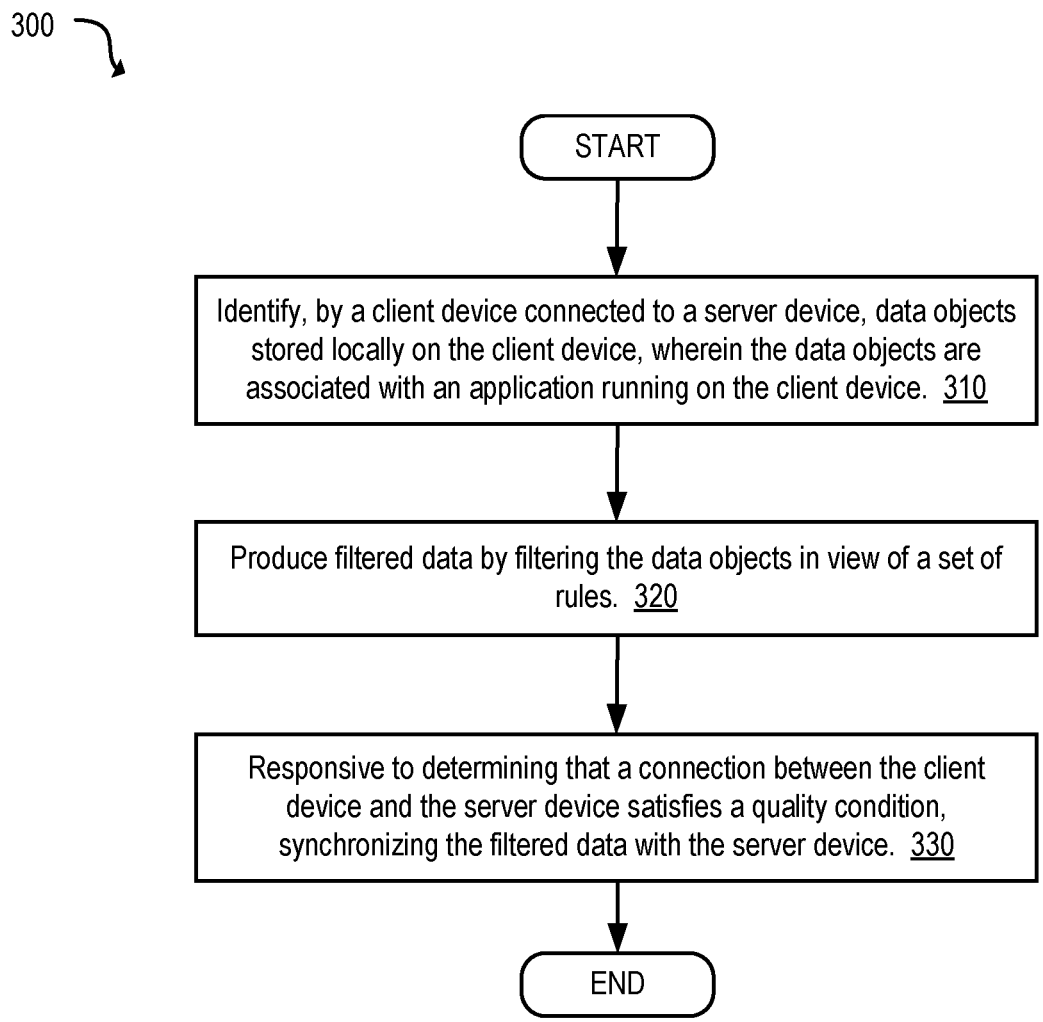
FIG. 3 is a flow diagram of an example method for filtering and synchronizing object storage data, in accordance with one or more aspects of the present disclosure.

FIG. 3 depicts a flow diagram of an example method 300 for filtering and synchronizing object data, in accordance with one or more aspects of the present disclosure. Method 300 may be performed by processing logic (e.g., in client device 110 of FIG. 1) that may comprise hardware (e.g., circuitry, dedicated logic, programmable logic, microcode, etc.), software (such as instructions run on a processing device), firmware, or a combination thereof. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). In one embodiment, method 300 may be performed by filtering and synchronization module 116 of FIG. 1.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At block 310, processing logic identifies, by the client device connected to the server device, data objects stored locally on the client device. The data objects are associated with an application running on the client device. The application can store, via an object storage gateway, the data objects on the client device in a local object repository.

At block 320, processing logic produces filtered data objects by filtering the data objects in view of a set of rules. Processing logic can receive the set of rules, which can vary from a simple rule to a complex analysis. The data objects can have associated metadata that, in part, specifies a function of the filtered data objects. When filtering the data objects in view of the set of rules, processing logic can update the metadata associated with the data objects to reflect a function of the filtered data objects. The function can be specified in the set of rules.

At block 330, responsive to determining that a connection between the client device and the server device satisfies a quality condition, processing logic synchronizes the filtered data objects with the server device. Synchronizing the filtered data objects can include synchronizing the metadata associated with the filtered data objects. In some embodiments, the quality condition can include a quality criterion that is satisfied in response to determining that there is a stable and/or reliable connection. In some embodiments, the quality criterion specifies a minimum bandwidth metric for the connection. That is, processing logic can determined the available bandwidth metric of the connection and compare it to a bandwidth threshold. In some embodiments, the quality criterion specifies, a minimum data speed metric, a jitter metric, any other quality metric associated with the network connection, and/or a combination of metrics. In some embodiments, the quality criterion can be satisfied if the connection exceeds one or more connection metrics for a predetermined period of time. The processing logic can continually monitor the network connection for the quality metrics, and/or can monitor the network connection on a predetermined schedule (e.g., once a hour, once a day, etc.). In some embodiments, the processing logic can determine the connection quality metric(s) in response to a triggering event, such as the amount of data being stored in local storage meeting or exceeding a capacity threshold.

In embodiments, the quality condition can specify predetermined quality levels, which can be dictate how much data to synchronize. For example, the quality condition can include four quality levels: good, reasonable, fair, and bad. The connection between the client device and the server device can be good if a quality metric associated with the connection is above a first threshold. The quality metric can be, for example, the available bandwidth. The connection between the client device and the sever device can be reasonable if the quality metric is between the first threshold and a second threshold. The connection can be fair if the quality metric is between the second threshold and a third threshold, and the connection can be bad if it is below the third threshold.

In embodiments, processing logic can then filter the data objects in accordance with the quality level. In some embodiments, processing logic can process the data objects and assign, for example, an importance score to the data object. Processing logic can then filter the a percentage of the data objects based on the corresponding importance score. For example, if the quality metric is reasonable, processing logic can filter out 50% of the data objects that have the lowest importance scores; if the quality metric is fair, processing logic can filter out 80% of the data objects that have the lowest importance scores (and hence can only synchronize the data objects with the top 20% importance scores). In some embodiments, the importance score can be included in the metadata of the data object.

To synchronize the filtered data objects, processing logic can transmit the filtered data objects and/or the metadata associated with the filtered data objects to an object storage gateway associated with the server device. In some embodiments, rather than filter the data based on the importance score, processing logic can synchronize the filtered data objects and/or the metadata based on the importance score. That is, processing logic can synchronize a subset of the filtered data objects based on the importance score associated with the quality metric of the connection between the client device and the server device.

In some embodiments, the processing logic can receive, from the server device, one or more changes associated with the application. The processing logic can update the application running on the client device in view of the received one or more changes. For example, the one or more changes can include a trained machine learning model that has been trained using at least a subset of the filtered data objects. As another example, the one or more changes can include a software update to be implemented by the processing logic. As yet another example, the processing logic can be associated with an autonomous vehicle, and the one or more changes can include current and/or updated traffic and/or road condition information.

Figure 4:
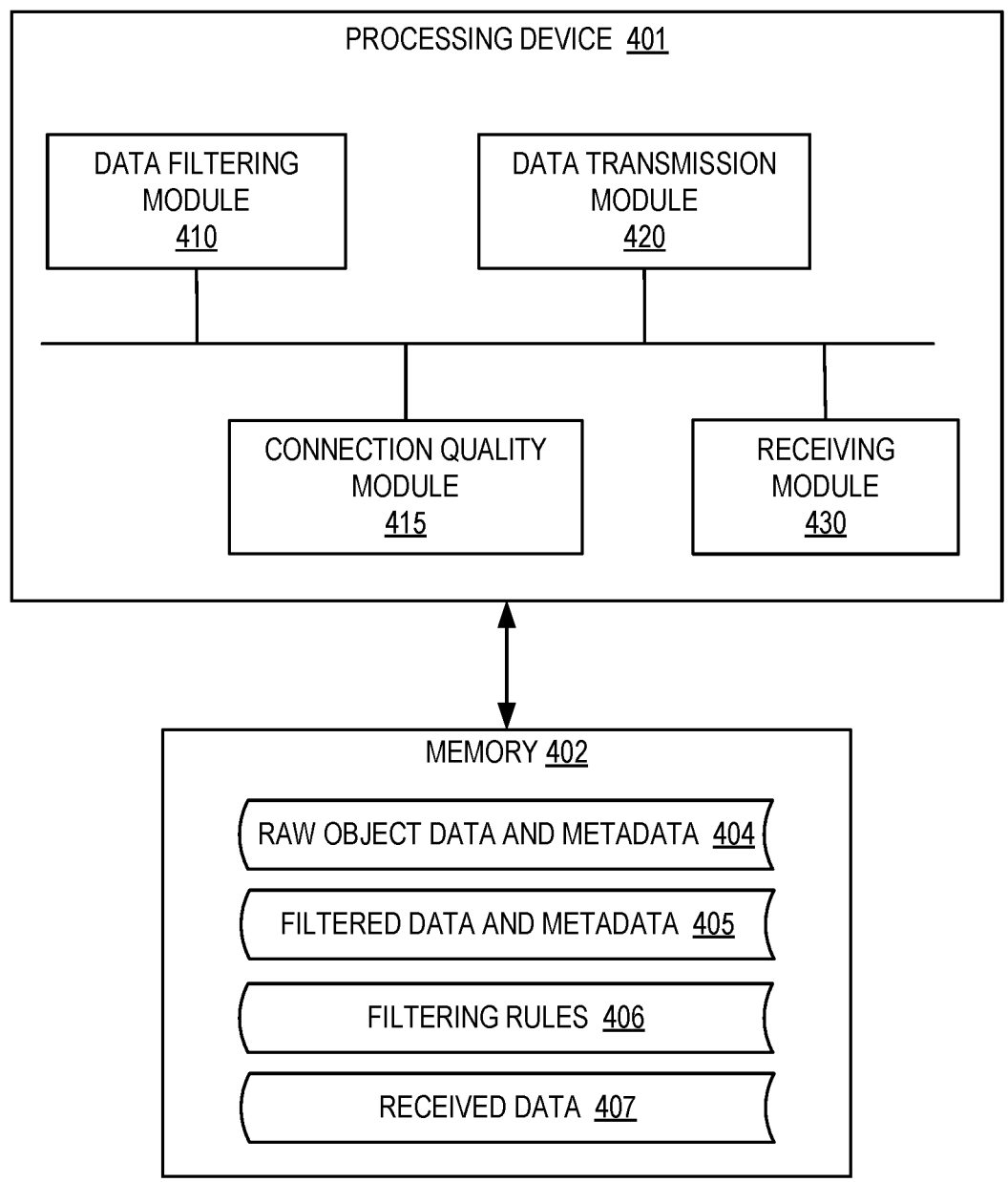
FIG. 4 depicts a block diagram of an example computer system operating in accordance with one or more aspects of the present disclosure.

FIG. 4 depicts a block diagram of a computer system 400, operating in accordance with one or more aspects of the present disclosure. Computer system 400 may be the same or similar to client device 110 of FIG. 1, or to client device 210 of FIG. 2. Computer system 400 may include a data filtering module 410, a connection quality module 415, a data transmission module 420, and/or a receiving module 430. Computer system 400 can also include a memory 402 that can store raw object data and metadata 404, filtered data and metadata 405, filtering rules 406, and/or received data 407. Raw object data and metadata 404 can store data generated by an application running on processing device 401, and/or data collected from applications running on other computing devices (i.e., other IoT and/or other edge devices) connected to processing device 401. Filtered data and metadata 405 can store object data that has been filtered according to filtering rules 406. In some embodiments, filtering rules 406 can be received and/or updated from a data center (e.g., data center 120 of FIG. 1, and/or data center 220 of FIG. 2). In some embodiments, an application running on processing device 401 can provide the filtering rules 406. Received data 407 can store data that has been received from a data center (e.g., data center 120 of FIG. 1, and/or data center 220 of FIG. 2).

Data filtering module 410 may enable a processor to filter raw object data and metadata 404 according to filtering rules 406, to generate and/or update filtered data and metadata 405. In some embodiments, filtered data and metadata 405 can be a list of references to raw object data and metadata 404, indicating which data objects in raw object data and metadata 404 are to be included in filtered data and metadata 405. Filtering rules 406 can specify a set of rules for filtering data objects. The set of rules can specify the business logic for the application running on processing device 401. For example, the filtering rules 406 can specify which data objects to keep based on the metadata of the data objects. Filtering rules 406 can specify updates to the metadata of the filtered data objects. For example, the updated metadata of the filtered data objects can include instructions for how the application receiving the filtered data and metadata 405 should use the filtered data objects. Data filtering module 410 can generate and/or update filtered data and metadata 405.

Connection quality module 415 can determine the quality of a network connection between the computing device executing processing device 401 and a data center (e.g., data center 120 of FIG. 1, and/or data center 220 of FIG. 2). The connection quality module 415 can monitor the connection to identify one or more quality metrics. The quality metrics can include, for example, whether the connection is functioning, the available bandwidth (e.g., the amount of data that can be transferred between the processing device 401 and the data center per second), the network speed (e.g., measuring the transfer rate of data being sent between the processing device 401 and the data center), the jitter (e.g., the time it takes for a data packet to travel across the network), the latency of the connection, and/or other quality metrics. In some implementations, the quality metric can be a binary flag that indicates whether the connection is operational or not. In some embodiments, the connection quality module 415 can use ping results to calculate the connection quality metrics. The connection quality module 415 can compare the measured quality metric(s) to a quality criterion to determine whether the connection can support a data transfer. The quality criterion can specify a minimum bandwidth metric, a minimum network speed, a minimum jitter, and/or a minimum latency metric, for example. If the measured quality metric(s) satisfies quality criterion, the connection quality module 415 can notify the data transmission module 420. In some embodiments, the connection quality module 415 can notify the data transmission module 420 any time the connection is up (i.e., operational). The connection quality module 415 can continue to monitor the connection quality, and can notify the data transmission module 420 when the connection falls below the quality criterion (or when the connection is no longer operational). Additionally or alternatively, the connection quality module 415 can rate the connection quality. For example, in addition to (or alternative to) notifying the data transmission module 420 of whether the connection is available (i.e., is "up" or "down"), the connection quality module 415 can notify the data transmission module 420 when the connection quality criterion satisfies a first criterion (e.g., the connection quality is considered "good" if the quality criterion is above a first threshold), satisfies a second criterion (e.g., the connection quality is considered "reasonable" if the quality criterion is between the first threshold and a second threshold), satisfies a third criterion (e.g., the connection quality is considered "slow" if the quality criterion is between the second threshold and a third threshold), and/or satisfies a fourth criterion (e.g., the connection quality is considered "down" if the quality criterion is below the third threshold).

Data transmission module 420 can determine when to transmit the filtered data and metadata 405 to a data center, based on the connection quality determined by connection quality module 415. Upon determining that the quality of the connection satisfies a quality criterion, the data transmission module 420 can start sending the filtered data and metadata 405 to the data center via the connection. In some embodiments, data transmission module 420 can determine how much of the filtered data and metadata 405 to transmit to a data center based on the connection quality determined by the connection quality module 415. For example, if the connection quality is "good," data transmission module 420 can transmit all of the filtered data to the data center; if the connection quality is "reasonable," data transmission module 420 can transmit 50% of the filtered data to the data center (e.g., the 50% with the highest importance scores); if the connection quality is "slow," data transmission module 420 can transmit 20% of the filtered data to the data center (e.g., the 20% with the highest importance scores); if the connection quality is "down," data transmission module 420 can transmit none of the filtered data to the data center.

The data transmission module 420 can keep track of which data has been received successfully by the data center 120. In the event that the connection is lost or falls below the quality criterion, the data transmission module 420 can pause the transmission of filtered data and metadata 405, noting which data has been successfully transmitted. When the connection satisfies the quality criterion, the data transmission module 420 can resume transmitting the filtered data and metadata 405. In some embodiments, when the connection changes levels (e.g., changes from "reasonable" to "good," or from "reasonable" to "slow"), the data transmission module 420 can pause or resume transmitting accordingly. That is, for an upgrade in the connection level, the data transmission module 420 can begin transmitting more of the filtered data and metadata 405; for a downgrade in the connection level, the data transmission module 420 can pause the transmission, and reassess which filtered data and metadata 405 to transmit.

The receiving module 430 can receive data from a data center, and can store it the received data 407. The received data 407 can include, for example, changes to the application running computing device executing processing device 401. The changes can include, for example, software updates, a trained machine learning model (e.g., that has been trained, or retrained, using the filtered data and metadata 405), updated information for us by the application (e.g., updated traffic and/or road condition information, updated weather information, etc.). The receiving module 420 can provide the received data 407 to an application running on computing device executing processing device 401, and/or to applications running on other processing devices (such as, on other IoT devices connected to processing device 401).

Figure 5:
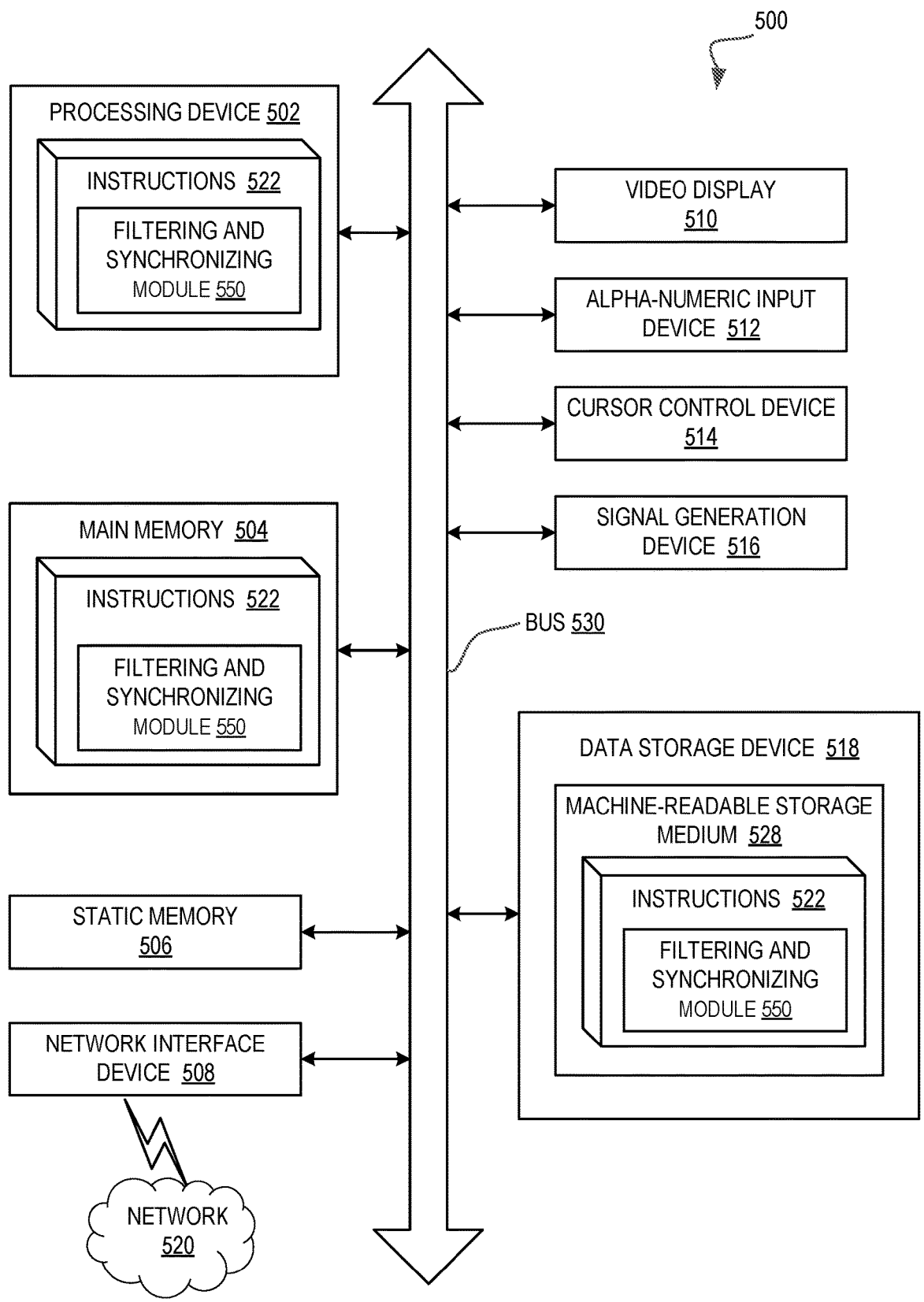
FIG. 5 depicts a block diagram of an illustrative computer system operating in accordance with one or more aspects of the present disclosure.

FIG. 5 is a diagrammatic representation of a machine in the exemplary form of a computer system 500 within which a set of instructions for causing the machine to perform any one or more of the methodologies discussed herein may be executed. In various illustrative examples, computer system 500 may correspond to client device 110 of FIG. 1, client device 210 of FIG. 2, and/or computer system 400 of FIG. 4. In some illustrative examples, computer system 500 may correspond to data center 120 of FIG. 1, and/or data center 220 of FIG. 2. Computer system 500 may be included within a data center that supports virtualization. Virtualization within a data center results in a physical system being virtualized using virtual machines to consolidate the data center infrastructure and increase operational efficiencies. A VM may be a program-based emulation of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain embodiments, computer system 500 may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. Computer system 500 may be provided by a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that device. Further, while only a single machine is illustrated, the term "computer" shall also be taken to include any collection of computers that individually or jointly execute a set (or multiple sets) of instructions to perform any one or more of the methodologies discussed herein.

The example computer system 500 may include a processing device 502, a main memory 504 (e.g., read-only memory (ROM), flash memory, dynamic random access memory (DRAM) (such as synchronous DRAM (SDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets. Processing device 502 may also be one or more special-purpose processing devices such as an application specific integrated circuit (ASIC), a field programmable gate array (FPGA), a digital signal processor (DSP), network processor, or the like. Processing device 502 may be configured to execute filtering and synchronizing module 550 for programming the operations and steps discussed herein. In some implementations, filtering and synchronizing module 550 may provide the features of filtering and synchronizing module 116 of FIG. 1 and/or filtering and synchronizing module 216 of FIG. 2. In some implements, filtering and synchronizing module 550 may provide the features of filtering and synchronizing module 126 of FIG. 1 and/or filtering and synchronizing module 226 of FIG. 2.

Computer system 500 may further include a network interface device 508. Computer system 500 may also include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 528 having one or more sets of instructions (e.g., filtering and synchronizing module 550) embodying any one or more of the methodologies of functions described herein. The filtering and synchronizing module 550 may also reside, completely or at least partially, within main memory 504 and/or within processing device 502 during execution thereof by computer system 500; main memory 504 and processing device 502 also constituting machine-readable storage media. Filtering and synchronizing module 550 may further be transmitted or received over a network 520 via network interface device 508.

Machine-readable storage medium 528 may also be used to store the device queue manner logic persistently. While machine readable storage medium 528 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling," "transmitting," "requesting," "identifying," "querying," "retrieving," "forwarding," "determining," "passing," "processing," "issuing," "measuring," "caching," "monitoring," mapping," "estimating," "calculating," "disabling," "detecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), erasable programmable ROMs (EPROMs), electrically erasable programmable ROMs (EEPROMs), magnetic or optical cards, flash memory devices including universal serial bus (USB) storage devices (e.g., USB key drives) or any type of media suitable for storing electronic instructions, each of which may be coupled to a computer system bus.

The methods and illustrative examples described herein are not inherently related to any particular computer or other apparatus. Various general purpose systems may be used with programs in accordance with the teachings herein or it may prove convenient to construct more specialized apparatus to perform the required method 300, and/or each of their individual functions, routines, subroutines or operations. Examples of the structure for a variety of these systems are set forth in the description above.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   identifying, by a client device connected to a server device, data objects stored locally on the client device, wherein the data objects are associated with an application running on the client device;
   producing filtered data by filtering the data objects in view of a set of rules, wherein the set of rules specify one or more object containers associated with the data objects; and
   responsive to determining that a connection between the client device and the server device satisfies a quality condition, synchronizing the filtered data with the server device.

2. The method of claim 1, wherein determining that the connection between the client device and the server device satisfies the quality condition comprises:
   determining that a bandwidth metric associated with the connection satisfies a threshold.

3. The method of claim 1, further comprising:
   receiving, from the server device, one or more changes associated with the application; and
   updating the application running on the client device in view of the one or more changes.

4. The method of claim 3, wherein the one or more changes comprise a trained machine learning model trained by the server device using at least a subset of the filtered data.

5. The method of claim 1, wherein producing the filtered data further comprises:
   updating metadata associated with the data objects, wherein the metadata specifies a function of the filtered data, and wherein the metadata comprises a set of key-value pairs that uniquely identify the associated data objects in the one or more object containers.

6. The method of claim 1, wherein synchronizing the filtered data with the server device comprises:
   synchronizing metadata associated with the filtered data; and
   transmitting the filtered data to an object storage gateway associated with the server device.

7. The method of claim 1, further comprising:
   storing, via an object storage gateway, the data objects on the client device in a local object repository.

8. A system comprising:
a memory; and
a processing device operatively coupled to the memory, the processing device to:
identify, by a client device connected to a server device, data objects stored locally on the client device, wherein the data objects are associated with an application running on the client device;
produce filtered data by filtering the data objects in view of a set of rules, wherein the set of rules specify one or more object containers associated with the data objects; and
responsive to determining that a connection between the client device and the server device satisfies a quality condition, synchronize the filtered data with the server device.

9. The system of claim 8, wherein the quality condition specifies a minimum bandwidth metric for the connection.

10. The system of claim 8, wherein the processing device is further to:
receive, from the server device, one or more changes associated with the application; and
update the application running on the client device in view of the one or more changes.

11. The system of claim 10, wherein the one or more changes comprise a trained machine learning model trained by the server device using at least a subset of the filtered data.

12. The system of claim 8, wherein to produce the filtered data, the processing device is further to:
update metadata associated with the data objects, wherein the metadata specifies a function of the filtered data, and wherein the metadata comprises a set of key-value pairs that uniquely identify the associated data objects in the one or more object containers.

13. The system of claim 8, wherein, to synchronize the filtered data with the server device, the processing device is further to:
synchronize metadata associated with the filtered data; and
transmit the filtered data and associated metadata to an object storage gateway associated with the server device.

14. The system of claim 8, wherein the processing device is further to:
store, via an object storage gateway, the data objects on the client device in a local object repository.

15. A non-transitory computer-readable media storing instructions that, when executed, cause a processing device to:
identify, by a client device connected to a server device, data objects stored locally on the client device, wherein the data objects are associated with an application running on the client device;
produce filtered data by filtering the data objects in view of a set of rules, wherein the set of rules specify one or more object containers associated with the data objects; and
responsive to determining that a connection between the client device and the server device satisfies a quality condition, synchronize the filtered data with the server device.

16. The non-transitory computer-readable media of claim 15, wherein, to determine that the connection between the client device and the server device satisfies the quality condition, the processing device is further to:
determine that a bandwidth metric associated with the connection satisfies a threshold.

17. The non-transitory computer-readable media of claim 15, wherein the processing device is further to:
receive, from the server device, one or more changes associated with the application; and
update the application running on the client device in view of the one or more changes.

18. The non-transitory computer-readable media of claim 15, wherein to produce the filtered data, the processing device is further to:
update metadata associated with the data objects, wherein the metadata specifies a function of the filtered data, and wherein the metadata comprises a set of key-value pairs that uniquely identify the associated data objects in the one or more object containers.

19. The non-transitory computer-readable media of claim 15, wherein, to synchronize the filtered data with the server device, the processing device is further to:
synchronize metadata associated with the filtered data; and
transmit the filtered data to an object storage gateway associated with the server device.

20. The non-transitory computer-readable media of claim 15, wherein the processing device is further to:
store, via an object storage gateway, the data objects on the client device in a local object repository.

* * * * *